(12) United States Patent
Minoshima (10) Patent No.: US 10,317,273 B2
(45) Date of Patent: Jun. 11, 2019

(54) LOAD MEASURING APPARATUS FOR CONSTRUCTION MACHINE

(71) Applicant: HITACHI CONSTRUCTION MACHINERY CO., LTD., Tokyo (JP)

(72) Inventor: Toshikazu Minoshima, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/555,190

(22) PCT Filed: May 26, 2015

(86) PCT No.: PCT/JP2015/065098
§ 371 (c)(1),
(2) Date: Sep. 1, 2017

(87) PCT Pub. No.: WO2016/189654
PCT Pub. Date: Dec. 1, 2016

(65) Prior Publication Data
US 2018/0052037 A1 Feb. 22, 2018

(51) Int. Cl.
*G01G 19/14* (2006.01)
*G01G 19/10* (2006.01)
(Continued)

(52) U.S. Cl.
CPC .............. *G01G 19/10* (2013.01); *B60G 13/06* (2013.01); *B60G 17/0182* (2013.01);
(Continued)

(58) Field of Classification Search
CPC ....... G01C 19/10; B60P 1/04; B60G 2300/02; B60G 2300/09; B60G 2400/51;
(Continued)

(56) References Cited

U.S. PATENT DOCUMENTS 4,832,141 A * 5/1989 Perini .................... G01G 19/10
177/141
4,852,674 A * 8/1989 Gudat .................... G01G 19/10
177/141
(Continued)

FOREIGN PATENT DOCUMENTS

CN       1641323 A       7/2005
CN     201464014 U  *    5/2010
(Continued)

OTHER PUBLICATIONS

International Search Report of PCT/JP2015/065098 dated Jun. 23, 2015.

*Primary Examiner* — Tuan C To
(74) *Attorney, Agent, or Firm* — Mattingly & Malur, PC (57) ABSTRACT

An object of the present invention is to provide a new load measuring apparatus for a construction machine that enables more enhancing measurement precision by monitoring a condition of a suspension cylinder. The load measuring apparatus for a construction machine according to the present invention is provided with a loading weight arithmetic module 111 that calculates a loading weight on the basis of loads of plural suspension cylinders 51 and a loading weight confirmation module 112 that outputs the calculated loading weight when the loads of the suspension cylinders 51 are all equal to or larger than a specified value and makes the calculated loading weight ineffective without outputting the loading weight when any one of the loads is below the specified value.

6 Claims, 6 Drawing Sheets

(51) Int. Cl.
  *B60G 13/06*    (2006.01)
  *B60G 17/018*   (2006.01)
  *G01G 19/02*    (2006.01)
  *B60P 1/04*         (2006.01)

(52) U.S. Cl.
  CPC ........... *G01G 19/028* (2013.01); *G01G 19/14* (2013.01); *B60G 2300/02* (2013.01); *B60G 2300/09* (2013.01); *B60G 2400/0512* (2013.01); *B60G 2400/204* (2013.01); *B60G 2400/208* (2013.01); *B60G 2400/252* (2013.01); *B60G 2400/51* (2013.01); *B60G 2400/5182* (2013.01); *B60G 2400/60* (2013.01); *B60G 2800/70* (2013.01); *B60P 1/04* (2013.01)

(58) Field of Classification Search
  CPC ........... B60G 2400/60; B60G 2800/70; B60G 13/06; B60G 17/0182; B60G 2400/0512; B60G 2400/204; B60G 2400/208; B60G 2400/252; B60G 2400/5182; G01G 19/14
  USPC ........................................................ 701/33.9
  See application file for complete search history.

(56) References Cited

U.S. PATENT DOCUMENTS

| | | | | |
|---|---|---|---|---|
| 6,144,295 | A * | 11/2000 | Adams | B60C 23/003 137/224 |
| 9,697,654 | B2 * | 7/2017 | Asada | G06Q 10/06 |
| 2004/0217566 | A1 * | 11/2004 | Huth | B60G 17/005 280/124.16 |
| 2005/0011190 | A1 * | 1/2005 | Bitter | B66F 9/065 60/468 |
| 2005/0167164 | A1 * | 8/2005 | Takeda | B60G 5/00 177/136 |
| 2005/0167165 | A1 * | 8/2005 | Takeda | B60G 5/04 177/136 |
| 2006/0151969 | A1 * | 7/2006 | Revill | B60G 17/056 280/124.106 |
| 2008/0269986 | A1 * | 10/2008 | Regnell | B60G 17/019 701/37 |
| 2009/0212473 | A1 * | 8/2009 | Matsuzaki | B60G 11/26 267/64.22 |
| 2010/0268410 | A1 * | 10/2010 | Vigholm | E02F 9/2217 701/31.4 |
| 2011/0010040 | A1 * | 1/2011 | Ichinose | B60P 1/045 701/31.4 |
| 2013/0120579 | A1 * | 5/2013 | Miitsuta | H04N 7/18 348/148 |
| 2014/0231153 | A1 * | 8/2014 | Fukasu | E02F 9/26 177/25.13 |
| 2014/0278041 | A1 * | 9/2014 | Brenninger | B60W 40/13 701/124 |
| 2015/0032373 | A1 * | 1/2015 | Ikari | E01C 23/01 701/517 |
| 2016/0016470 | A1 * | 1/2016 | Pichlmaier | B60K 35/00 701/34.2 |
| 2016/0031448 | A1 * | 2/2016 | Sakai | G05B 9/02 701/23 |
| 2016/0033968 | A1 * | 2/2016 | Sakai | G08C 17/02 701/23 |
| 2016/0039480 | A1 * | 2/2016 | Pichlmaier | G07C 5/085 701/29.1 |
| 2016/0155277 | A1 * | 6/2016 | Asada | B60C 19/00 701/70 |
| 2016/0258118 | A1 * | 9/2016 | Jinno | B60W 40/06 |
| 2016/0264134 | A1 * | 9/2016 | Ohsugi | B60W 30/095 |

FOREIGN PATENT DOCUMENTS

| | | | |
|---|---|---|---|
| CN | 101806610 A | | 8/2010 |
| CN | 101504307 B | * | 1/2011 |
| JP | 60-161532 A | | 8/1985 |
| JP | 02-006717 A | | 1/1990 |
| JP | 10-253430 A | | 9/1998 |
| JP | 2005-043267 A | | 2/2005 |
| JP | 2005043267 A | * | 2/2005 |
| JP | 2005-061984 A | | 3/2005 |
| JP | 2005061984 A | * | 3/2005 |
| JP | 2007-298449 A | | 11/2007 |
| JP | 2007298449 A | * | 11/2007 |
| JP | 2008096255 A | * | 4/2008 |
| JP | 2010-190617 A | | 9/2010 |
| JP | 5160468 B2 | | 3/2013 |
| KR | 101104330 B1 | * | 1/2012 |

* cited by examiner

LOAD MEASURING APPARATUS FOR CONSTRUCTION MACHINE

TECHNICAL FIELD

The present invention relates to a load measuring apparatus for a construction machine for enhancing load measurement precision of a construction machine such as a dump truck.

BACKGROUND ART

A load measuring apparatus for preventing an overload and for grasping production amount in a field and others is mounted in a dump truck that operates in a mine, a quarry and others. This load measuring apparatus measures a load on the basis of pressure applied to plural (normally, total four in the front-right, the front-left, the rear-right, the rear-left of a vehicle body) suspensions that support the vehicle body, the load measuring apparatus records and displays measured values at any time as disclosed in the following patent literature 1, for example.

In such a load measuring apparatus, it greatly depends upon a traveling path whether a state suitable for measuring a load is acquired in normal loaded traveling or not. For example, in a case seen in a quarry by cutting through a mountain that crushed stone is loaded on the upside of the mountain and a dump truck descends on a slope as it is, precise load measurement cannot be made because a traveling road has no flat location. Therefore, in the following patent literature 2, for example, a device that measures a load and records a measured value at timing hardly having the effect of a traveling state and a state of the ground, for example, during backward travel when a dump truck discharges soils is disclosed.

Besides, as disclosed in the following patent literature 3, technique for equalizing pressure of each suspension so as to inhibit the effect of a jolt in traveling and frictional resistance of suspension cylinders is also proposed. Further, as disclosed in the following patent literature 4, as lateral balance is often lost when the dump truck travels on a curved path, technique that enhances measurement precision by inhibiting load measurement in such a case is also proposed.

CITATION LIST

Patent Literature

PATENT LITERATURE 1: JP-A No. 2007-298449
PATENT LITERATURE 2: JP-A No. 2005-43267
PATENT LITERATURE 3: JP-A No. 1985-161532
PATENT LITERATURE 4: Japanese Patent No. 5160468

SUMMARY OF INVENTION

Technical Problem

Incidentally, in four suspension cylinders used for the above-mentioned conventional type load measuring apparatuses, an oil content called silicone oil and nitrogen gas are sealed inside. As for pressure in such the suspension cylinder, predetermined internal pressure (gas charge set pressure) is normally applied, however, pressure in the suspension cylinder is sometimes turned below the predetermined gas charge set pressure because of running on of a vehicle body, inappropriate maintenance and others. In such a state, longitudinal and lateral balance of the vehicle body is turned unstable and an error of load measurement increases.

Besides, even if gas charge set pressure of all the suspension cylinders is kept at gas charge set pressure of a specified value, load balance is turned unstable depending upon posture in loading so that a load may be received by only three or two out of the four suspension cylinders, it cannot be judged that a load is uniformly applied to all the suspension cylinders.

Then, the present invention is made so as to settle these problems and an object of the present invention is to provide a new load measuring apparatus for a construction machine that enables enhancing measurement precision of a loading weight by considering a condition of a suspension cylinder.

Solution to Problem

To achieve the object, a first feature of the present invention is based upon a load measuring apparatus for a construction machine having a loading weight arithmetic module calculating a loading weight on the basis of loads of a plurality of suspension cylinders. The load measuring apparatus is provided with a loading weight confirmation module outputting the loading weight calculated by the loading weight arithmetic module when all of the loads of the suspension cylinders are equal to or larger than a specified value, the loading weight confirmation module making the loading weight calculated by the loading weight arithmetic module ineffective without outputting the loading weight when any one of the loads of the suspension cylinders is below the specified value.

According to such configuration, as a loading weight confirmation module judges that longitudinal and lateral balance of a vehicle body is unsatisfactory when any one of loads of each suspension cylinder is below the specified value and makes a loading weight calculated by the loading weight arithmetic module ineffective without outputting the loading weight, measurement having a large error can be avoided. Hereby, as only a precise measured value is outputted, measurement precision of the loading weight can be enhanced.

A second feature of the present invention based upon the first feature relates to the load measuring apparatus for a construction machine having a characteristic that a load of each suspension cylinder is calculated on the basis of a pressure applied to an inside of the each suspension cylinder. According to such configuration, when pressure applied to the inside of the suspension cylinder is turned equal to or less than the specified pressure because of running on of the vehicle body, inappropriate maintenance or the like, the loading weight confirmation module can make a loading weight ineffective without outputting the loading weight calculated by the loading weight arithmetic module.

A third feature of the present invention based upon the second feature relates to the load measuring apparatus for a construction machine having a characteristic that the pressure applied to the each suspension cylinder is a pressure of a fluid sealed in the suspension cylinder. According to such configuration, when fluid pressure in the suspension cylinder is equal to or less than the specified pressure because of running on of the vehicle body, inappropriate maintenance or the like, the loading weight confirmation module can make a loading weight ineffective without outputting the loading weight calculated by the loading weight arithmetic module.

A fourth feature of the present invention based upon the first feature relates to the load measuring apparatus for a construction machine having a characteristic that a load of each suspension cylinder is calculated on the basis of a stroke of the each suspension cylinder. According to such configuration, when the stroke of the suspension cylinder exceeds a specified range because of running on of the vehicle body, inappropriate maintenance or the like, the loading weight confirmation module can make a loading weight ineffective without outputting the loading weight calculated by the loading weight arithmetic module.

A fifth feature of the present invention based upon any of the first to fourth features relates to the load measuring apparatus for a construction machine having a characteristic that the specified value for the loads of the suspension cylinders are different between for front-wheel side suspension cylinders and for rear-wheel side suspension cylinders. Normally, loads applied to the front-wheel side suspension cylinders and the rear-wheel side suspension cylinders are often different from each other because of structure of the dump truck. According to such configuration, optimum output according to each suspension cylinder or invalidation can be judged.

A sixth feature of the present invention based upon any of the first to fourth features relates to the load measuring apparatus for a construction machine having a characteristic that the specified value for the loads of the suspension cylinders are different among each of front, rear, left, and right suspension cylinders. Normally, loads applied to respective suspension cylinders may be different from each other because of the structure of the dump truck. According to such configuration, optimum output according to each suspension cylinder or invalidation can be judged.

Advantageous Effects of Invention

According to the present invention, when any one of loads of respective suspension cylinders is less than the specified value, it is judged that longitudinal and lateral balance of the vehicle body is unsatisfactory and a loading weight calculated by the loading weight arithmetic module is made ineffective without outputting the loading weight, thereby a measurement having a large error can be avoided. Hereby, only precise measured values are outputted so that a measurement precision can be more enhanced.

DESCRIPTION OF EMBODIMENTS

Figure 1:
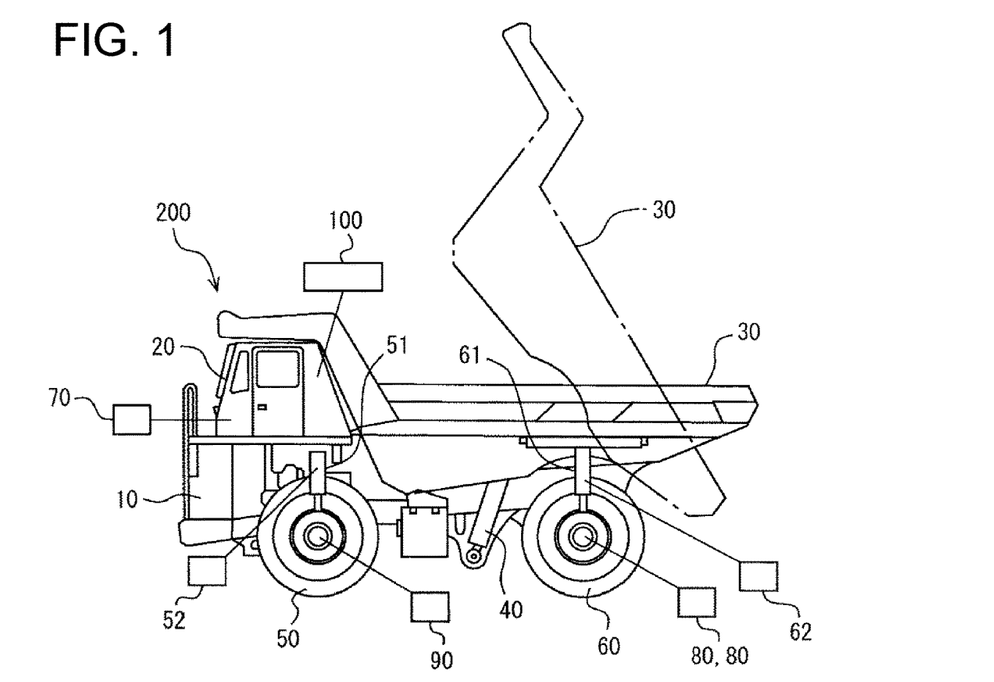
FIG. 1 is a side view showing a dump truck 200 as one example of a construction machine to which a load measuring apparatus 100 according to the present invention is applied.
Figure 2:
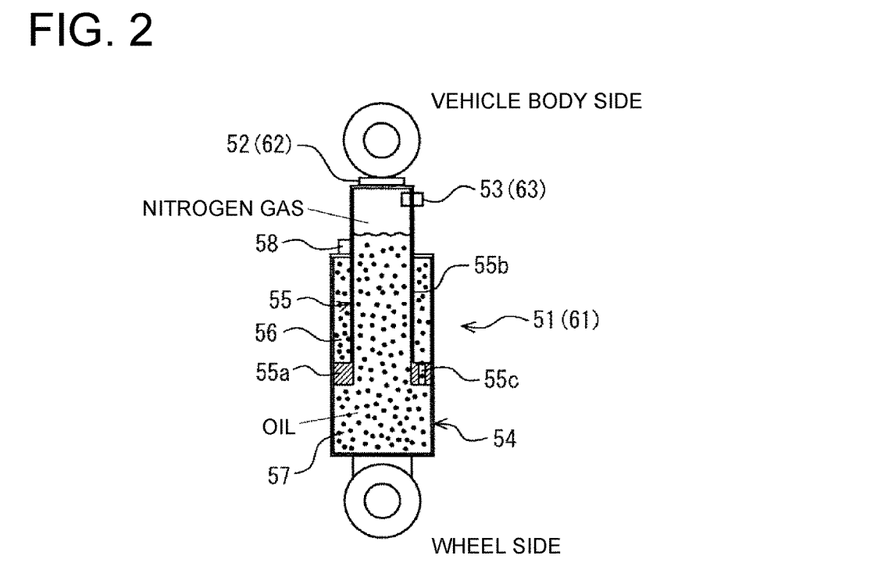
FIG. 2 is a longitudinal section view showing simplified structure of a suspension cylinder 51, 61.
Figure 3:
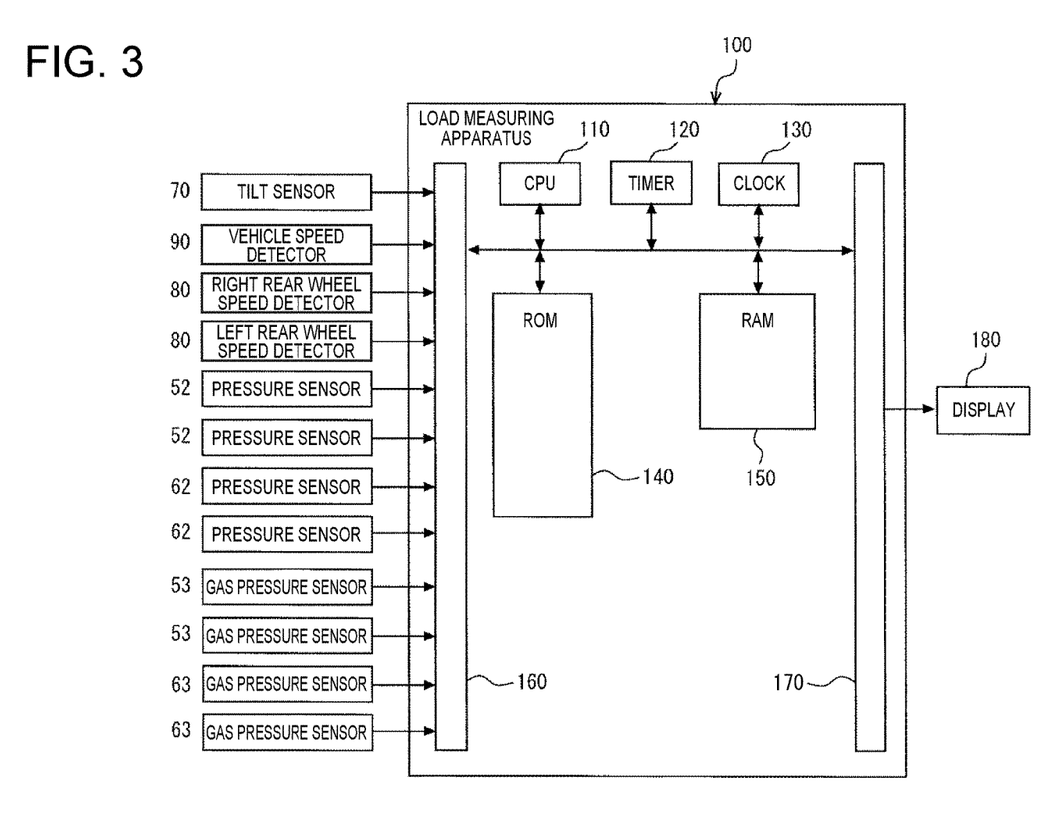
FIG. 3 is a hardware configuration diagram showing the load measuring apparatus 100 according to the present invention.
Figure 4:
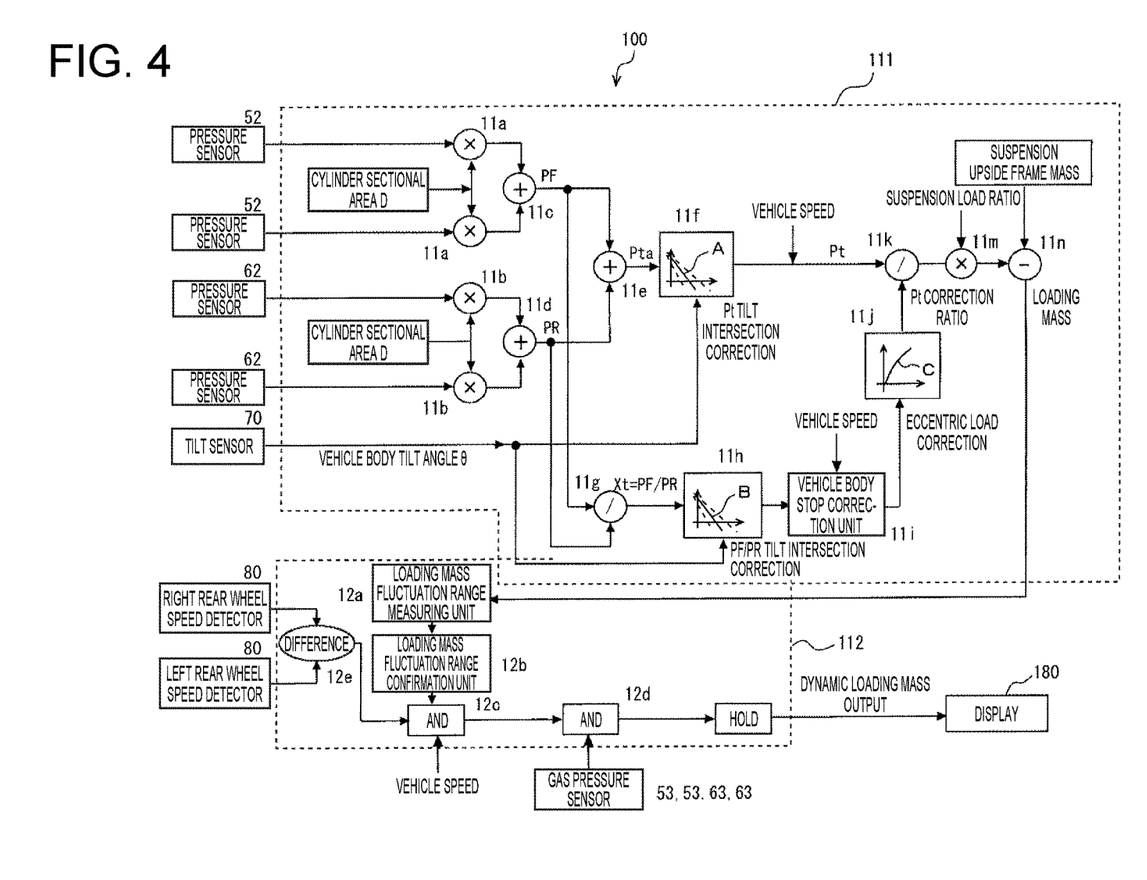
FIG. 4 is a functional block diagram showing the load measuring apparatus 100 according to the present invention.
Figure 5:
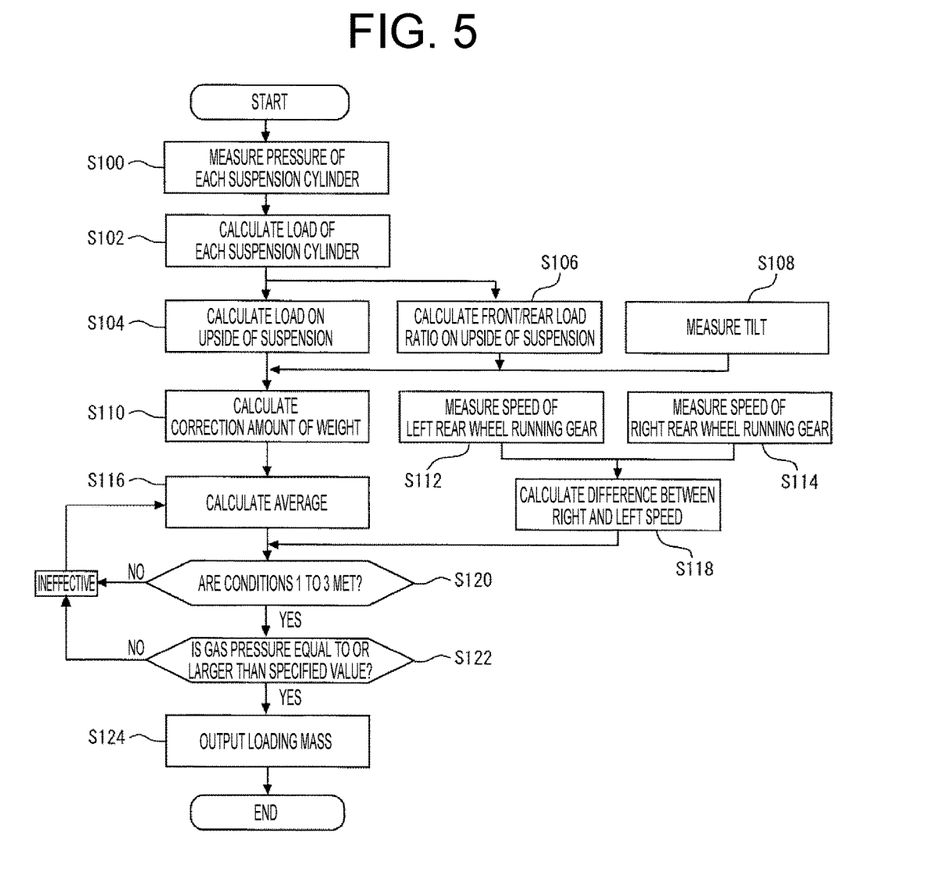
FIG. 5 is a flowchart showing one example of a process flow by the load measuring apparatus 100 according to the present invention.

Next, embodiments of the present invention will be described referring to the attached drawings. FIGS. 1 to 5 show one embodiment of a load measuring apparatus 100 for a construction machine according to the present invention. FIG. 1 is a side view showing a dump truck 200 as one example of a construction machine to which the load measuring apparatus 100 according to the present invention is applied, FIG. 2 is a longitudinal section view showing simplified structure of suspension cylinders 51, 61 provided to the dump truck 200, FIG. 3 is a block diagram showing the load measuring apparatus 100 according to the present invention, FIG. 4 is similarly a functional block diagram showing the load measuring apparatus 100 according to the present invention, and FIG. 5 is similarly a flowchart showing a process of the load measuring apparatus 100 according to the present invention.

The dump truck 200 to which the load measuring apparatus 100 according to the present invention is applied is provided with a vehicle body 10, an operator cab 20 provided to the front of the vehicle body 10, a vessel 30 onto which a load such as earth, sand and crushed stone is loaded, a vessel operating cylinder 40 for vertically turning the vessel 30 as shown by a dash-dotted line, front wheels 50 (the other is not shown) arranged on the right and left sides of the front side of the vehicle body 10, suspension cylinders 51 (the other is not shown) on the right and left sides of the front side for supporting front wheels 50,50, respectively, rear wheels 60 (the other is not shown) arranged on the right and left sides of the rear side of the vehicle body 10 and suspension cylinders 61 (the other is not shown) on the right and left sides of the rear side for supporting rear wheels 60, 60, respectively as shown in FIG. 1. Some dump trucks may be provided with total four rear wheels 60 (pairs of two) on the right and left sides of the rear side of the vehicle body 10.

Moreover, in the operator cab 20 of the vehicle body 10 as shown in FIG. 1, a tilt sensor 70 that senses a tilt angle in a longitudinal direction of the vehicle body 10 is provided. In addition, rear wheel speed detectors 80, 80 that detect rotational speed of the rear wheels are provided to the right and left rear wheels 60, 60, respectively, and further, a vehicle speed detector 90 that detects speed of the vehicle body 10 is provided to the vehicle body 10.

Pressure sensors 52, 52, 62, 62 are attached to the four suspension cylinders 51, 51, 61, 61 arranged in longitudinal and lateral directions of the vehicle body 10, for sensing loads applied to the respective cylinders, as equipment for measuring weight of a load as shown in FIG. 2.

As shown in FIG. 2, each of the suspension cylinders 51, 51, 61, 61 is provided with a cylinder 54 that supports the side of wheels 50, 50, 60, 60 and a piston 55 that supports the side of the vehicle body 10. The piston 55 is provided with a piston body 55a vertically sliding in the cylinder 54 and a piston tube 55b coupled to the piston body 55a.

The cylinder 54 is partitioned into a head chamber 56 and a bottom chamber 57 by the piston body 55a so that oil flows between the head chamber 56 and the bottom chamber 57 via an orifice 55c formed through the piston body 55a. Nitrogen gas is sealed together with the oil in the piston tube 55b communicating with the bottom chamber 57 and pressure of the nitrogen gas is measured by a gas pressure sensor 53 provided to the piston tube 55b at any time. Measurement signals from these sensors 52, 53, 62, 70 are inputted to the load measuring apparatus 100 according to the present invention as shown in FIG. 3.

FIG. 3 shows hardware configuration of the load measuring apparatus 100 according to the present invention. As shown in FIG. 3, a detection signal from the tilt sensor 70 that senses a tilt angle in the longitudinal direction of the vehicle body 10, a detection signal from the vehicle speed detector 90 that detects the speed of the vehicle body 10, detection signals from the rear wheel speed detectors 80, 80 that detect rotational speeds of the respective right and left rear wheels 60, 60, detection signals from the pressure sensors 52, 52, 62, 62 that measure loads of the respective suspension cylinders 51, 51, 61, 61 and detection signals from the gas pressure sensors 53, 53, 63, 63 that measure inside gas pressures of the respective suspension cylinders 51, 51, 61, 61 are inputted to the load measuring apparatus 100.

The load measuring apparatus 100 is provided with an arithmetic unit (CPU) 110 that calculates according to various processing programs, a timer 120 that drives the arithmetic unit 110, a clock 130 for acquiring time, a read only memory (ROM) 140 that stores various processing programs, a random access memory (RAM) 150 that temporarily stores variable values and load data as a result of load measurement, an input interface 160 for input from the sensors and for communication and an output interface 170 for outputting an calculation result from the arithmetic unit 110 to a display 180 installed in the operator cab 20 and an external device (not shown) such as a control center.

The ROM 140 stores a value D of a sectional area of each cylinder of the front-wheel side suspension cylinders 51, 51, and the rear-wheel side suspension cylinders 61, 61; a weight G of the vehicle body 10 side supported by each of the front-wheel side suspension cylinders 51, 51 and the rear-wheel side suspension cylinders 61, 61; a total load Pt correction characteristic A for calculating a total load Pta when no tilt is applied from a total load Pt that acts on all the suspension cylinders 51, 51, 61, 61 on the basis of a tilt angle θ of the vehicle body 10 from the tilt sensor 70; a front/rear load ratio X correction characteristic B for calculation a load ratio X when no tilt is applied from a load ratio Xt of the suspension that is a ratio of a front side load PF that acts on the front-wheel side suspension cylinders 51, 51, to a rear side load PR that acts on the rear-wheel side suspension cylinders 61, 61(Xt=PF/PR) on the basis of the tilt angle θ of the vehicle body 10 from the tilt sensor 70; and a total load Pt correction ratio characteristic C for calculating loading eccentricity correction ratio Xa of the total load Pt on the basis of the corrected front/rear load ratio X in addition to various processing programs respectively as shown in FIG. 4.

Next, a concrete process flow in the load measuring apparatus 100 configured as described above according to the present invention will be described referring to the block diagram shown in FIG. 3, the functional block diagram shown in FIG. 4 and the flowchart shown in FIG. 5. The arithmetic unit 110 of the load measuring apparatus 100 shown in FIG. 3 functions as a loading weight arithmetic module 111 for calculating a payload amount (loading amount) loaded onto the vessel 30 and a loading weight confirmation module 112 for confirming whether the payload amount (loading amount) calculated by the loading weight arithmetic module 111 is to be outputted or not according to the various processing programs stored in the ROM 140 as shown in FIG. 4.

As shown in FIG. 4, first, the loading weight arithmetic module 111 is provided with first multipliers 11*a*, 11*a* that multiply cylinder pressures output from the pressure sensors 52, 52 for measuring each of the cylinder pressures of the front-wheel side suspension cylinders 51, 51 and the value D of the sectional area of the suspension cylinder 51 stored beforehand respectively so as to calculate loads respectively acting on the front-wheel side suspension cylinders 51, 51; second multipliers 11*b*, 11*b* that similarly multiply suspension cylinder pressures output from the pressure sensors 62, 62 for measuring each of the cylinder pressures of the rear-wheel side suspension cylinders 61, 61 and the value D of the sectional area of the suspension cylinder 61 stored beforehand respectively so as to calculate loads respectively acting on the rear-wheel side suspension cylinders 61, 61; a first adder 11*c* that adds respective loads of the front-wheel side suspension cylinders 51, 51 output from the first multipliers 11*a*, 11*a* so as to calculate the front side load PF acting on the front-wheel side suspension cylinders 51, 51; a second adder 11*d* that similarly adds respective loads of the rea-wheel side suspension cylinders 61, 61 output from the second multipliers 11*b*, lib so as to calculate the rear side load PR acting on the rear-wheel side suspension cylinders 61, 61; and a third adder 11*e* that adds the front side load PF output from the first adder 11*c* and the rear side load PR output from the second adder 11*d* so as to calculate the total load Pt of the suspension cylinders 51, 51, 61, 61.

Further, the loading weight arithmetic module 111 is provided with a total load correction arithmetic unit 11*f* that calculates the total load Pt when the vehicle body 10 is not tilted from the total load Pta of the suspension cylinders 51, 51, 61, 61 output from the third adder 11*e* on the basis of the tilt angle θ output from the tilt sensor 70 and the total load Pt correction characteristic A stored beforehand; a first divider 11*g* that calculates the front/rear load ratio Xt (Xt=PF/PR) that is a ratio of the front side load PF output from the first adder 11*c* to the rear side load PR output from the second adder 11*d*; a front/rear load ratio correction arithmetic unit 11*h* that calculates a corrected front/rear load ratio X when the vehicle body 10 is not tilted from the front/rear load ratio Xt output from the first divider 11*g* on the basis of a tilt angle θ from the tilt sensor 70 and the front/rear load ratio X correction characteristic B stored beforehand; a vehicle body stop correction unit 11*i* that determines whether the vehicle body 10 travels or stops on the basis of a vehicle speed signal; a total load correction ratio arithmetic unit 11*j* that calculates loading eccentricity correction ratio Xa of the total load Pt on the basis of the corrected front/rear load ratio X output from the front/rear load ratio correction arithmetic unit 11*h* and the total load Pt correction ratio characteristic C of the loading eccentricity correction ratio; a second divider 11*k* that divides the corrected total load Pt output from the total load correction arithmetic unit 11*f* by the loading eccentricity correction ratio Xa of the total load Pt output from the total load correction ratio arithmetic unit 11*j*; a third multiplier 11*m* that multiplies the total load Pt output from the second divider 11*k* by suspension load ratio; and a subtracter 11*n* that subtracts a frame mass upside the suspension being a weight of the vehicle body 10 side supported by the front-wheel side suspension cylinders 51, 51 and the rear-wheel side suspension cylinders 61, 61 from the total load Pt output from the third multiplier 11*m* so as to calculate the loading mass.

In the meantime, the loading weight confirmation module 112 is provided with a loading mass fluctuation range measuring unit 12*a* that samples the loading mass output from the loading weight arithmetic module 111 several times within a definite time; a loading mass fluctuation range confirmation unit 12*b* that calculates an average value of measured values output from the loading mass fluctuation range measuring unit 12*a*, and confirms that the difference between the maximum measured value and the minimum measured value is minimum for the average value; a speed difference detector 12*e* that calculates difference between speeds respectively from the right and left rear wheel speed detectors 80, 80 for detecting the rotational speed of the respective right/left rear wheels 60, 60; and a first confirmation arithmetic unit (a logical multiply operation unit: AND) 12c that outputs the loading mass output from the loading weight arithmetic module 111 when the following three conditions are satisfied and that makes the loading mass output from the loading weight arithmetic module 111 as an output of the final loading mass ineffective when any one of the these conditions is not satisfied. The above-mentioned conditions are as follows. The condition 1 is a case that the vehicle speed output from the vehicle speed detector 90 is equal to or larger than a predetermined set value (for example, a few km/h) and a traveling state is so-called a load weight measurable, the condition 2 is a case that the loading mass output from the loading mass fluctuation range confirmation unit 12b is within fluctuation, and the condition 3 is a case that the difference between speeds respectively output from the rear wheel speed detectors 80, 80 is smaller than the predetermined set value, and it is judged the dump track travels not on a so-called curved path but on a linear path.

Further, the loading weight confirmation module 112 is provided with a second confirmation arithmetic unit (a logical multiply operation unit: AND) 12d in addition to the first confirmation arithmetic unit 12c. The second confirmation arithmetic unit 12d judges gas pressures inside the respective suspension cylinders 51, 51, 61, 61 on the basis of detection values from respective gas pressure sensors 53, 53, 63, 63 provided to suspension cylinders 51, 51, 61, 61, respectively. When all the gas pressures are equal to or larger than a specified value (a condition 4), the loading mass calculated in the first confirmation arithmetic unit 12c is hold and is outputted to the external display 180 as a final output, and when any of the gas pressures is below the specified value, the loading mass calculated in the first confirmation arithmetic unit 12c is made ineffective without outputting to the external display 180 as a final output. The present invention is not limited to the case that the specified values for judging the gas pressures of the suspension cylinders 51, 51, 61, 61 are the same (several to approximately dozen MPa), however, the specified values may be different between the front wheels and the rear wheels or every wheel.

Next, one example of processing operation of the load measuring apparatus 100 for a construction machine according to the present invention configured as described above will be described referring to the flowchart shown in FIG. 5. When an engine switch is turned on and this device 100 is activated, in a first step S100, the first multipliers 11a, 11a and the second multipliers 11b, 11b of the loading weight arithmetic module 111 measure respective cylinder pressures of the suspension cylinders 51, 51 on the front wheels 50, 50 sides and the suspension cylinders 61, 61 on the rear wheels 60, 60 sides obtained from the pressure sensors 52, 52, 62, 62 and a process flow proceeds to the next step S102. In the step S102, respective cylinder pressures and the values D of the sectional areas of respective suspension cylinders 51, 51, 61, 61 stored beforehand are respectively multiplied so as to calculate the loads acting on the suspension cylinders 51, 51, 61, 61 respectively, and the process flow proceeds to the next step s104.

In the next step S104, loads of the front-wheel side suspension cylinders 51, 51 output from the first multipliers 11a, 11a are added by the first adder 11c so as to calculate the front side load PF that acts on the front-wheel side suspension cylinders. Also, the second adder 11d similarly calculates the rear side load PR that acts on the rear-wheel side suspension cylinders 61, 61 on the basis of loads output from the second multipliers 11b, 11b. The third adder 11e adds the front side load PF output from the first adder 11c and the rear side load PR output from the second adder 11d so as to calculate the total load Pta of the suspension cylinders 51, 51, 61, 61.

In parallel with the step S104, in a step S106, the front/rear load ratio Xt (Xt=PF/PR) of the front side load PF output from the first adder 11c to the rear side load PR output from the second adder 11d is calculated by the first divider 11g and the process flow proceeds to a step S110. Similarly, in a step S108, a tilt angle θ is calculated on the basis of a signal from the tilt sensor 70 and the process flow proceeds to the step S110.

In the step S110, a correction amount of weight is calculated. That is, the total load correction arithmetic unit 11f calculates a corrected total load Pt when the vehicle body 10 is not tilted from the total load Pta output from the third adder 11e of the suspension cylinders 51, 61 on the basis of the tilt angle θ and the total load Pt correction characteristic A stored beforehand. Also, the front/rear load ratio correction arithmetic unit 11h calculates a corrected front/rear load ratio X when the vehicle body 10 is not tilted from the front/rear load ratio Xt output from the first divider 11g on the basis of the tilt angle θ from the tilt sensor 70 and the front/rear load ratio X correction characteristic B stored beforehand.

The total load correction ratio arithmetic unit 11j calculates loading eccentricity correction ratio Xa of the total load Pt on the basis of the corrected front/rear load ratio X output from the front/rear load ratio correction arithmetic unit 11h and the total load Pt correction ratio characteristic C of the loading eccentricity correction ratio. Also, the second divider 11k divides the corrected total load Pt output from the total load correction arithmetic unit 11f by the loading eccentricity correction ratio Xa of the total load Pt output from the total load correction ratio arithmetic unit 11j. At this time, the second divider 11k takes the vehicle speed signal, and the second divider 11k does not execute these processes when it is determined that the vehicle body stops, these processing is not executed. The subtracter 11n subtracts a frame mass of the vehicle body 10 side supported by the front-wheel side suspension cylinders 51, 51 and the rear-wheel side suspension cylinders 61, 61 from the total load Pt output from the third multiplier 11m so as to calculate the loading mass, and the process flow proceeds to the next step S116.

Next, in the step S116, the loading mass fluctuation range measuring unit 12a in the loading weight confirmation module 112 samples the loading mass output from the loading weight arithmetic module 111 several times within a definite time. The loading mass fluctuation range confirmation unit 12b calculates the average value of measured values output from the loading mass fluctuation range measuring unit 12a, confirms that the difference between the maximum measured value and the minimum measured value is minimum for the average value, and the process flow proceeds to a step S120. Also, in parallel with this, in steps S112, S114, S118, the speed difference detector 12e calculates difference between each of the speeds from the rear wheel speed detectors 80, 80.

In the step S120, the first confirmation arithmetic unit 12c outputs the loading mass output from the loading weight arithmetic module 111 as a payload when the following three conditions are met (YES) and the process flow proceeds to the next step S122. The above-mentioned three conditions are as follows. The condition 1 is that the vehicle speed output from the vehicle speed detector 90 is equal to or larger than a predetermined set value (for example, a few km/h) and a traveling state is so-called a load weight measurable, the condition 2 is a case that the loading mass output from the loading mass fluctuation range confirmation unit 12b is within fluctuation, and the condition 3 is a case that the difference between speeds respectively output from the rear wheel speed detectors 80, 80 is smaller than the predetermined set value, and it is judged the dump track travels not on a so-called curved path but on a linear path. On the other hand, when any one of the conditions 1 to 3 is not met (NO), the first confirmation arithmetic unit 12c makes the output of loading mass from the loading weight arithmetic module 111 ineffective and the process flow proceeds to the step S116.

In the step S122, the second confirmation arithmetic unit 12d judges whether all of the gas pressures of the suspension cylinders 51, 51, 61, 61 exceed the specified value on the basis of measured values output from the gas pressure sensors 53, 53, 63, 63 or not. When the second confirmation arithmetic unit 12d judges that all of the gas pressures exceed the specified value (YES), the loading mass output from the first confirmation arithmetic unit 12c is outputted as a payload and the process flow proceeds to the next step S124, however, when the second confirmation arithmetic unit 12d judges that any one is smaller than the specified value (NO), the loading mass output from the first confirmation arithmetic unit 12c is made ineffective, and the process flow is returned to the step S116.

In the step S124, the loading mass acquired from the loading weight arithmetic module 111 in a state in which all of the these conditions 1 to 4 are satisfied is held and output, and the loading mass is displayed on the display 180.

As described above, according to the present invention, not only when the conditions for the traveling path of the dump truck 200 and the fluctuation of the loading mass are satisfied, but also when any one of gas charge set pressure of respective suspension cylinders 51, 51, 61, 61 is below the specified value, it is judged that the longitudinal and lateral balance of the vehicle body is unsatisfactory so that the loading mass calculated by the loading weight arithmetic module 111 is made ineffective without outputting. Therefore, a situation that a measured value having a large error is held and displayed can be avoided. Hereby, as only a precise measured value is outputted, measuring precision can be more enhanced.

In this embodiment, after the first confirmation arithmetic unit 12c confirms that the conditions 1 to 3 are satisfied, the second confirmation arithmetic unit 12d judges whether all of the gas pressures of the suspension cylinders satisfy the specified value (the condition 4) or not. However, the condition 4 is judged in advance and when the condition 4 is satisfied, it may be also judged whether the conditions 1 to 3 are met or not. Besides, the judgment can be made at a timing not only immediately before the first confirmation arithmetic unit 12c but at an earlier stage, for example, immediately after the step S100.

Figure 6:
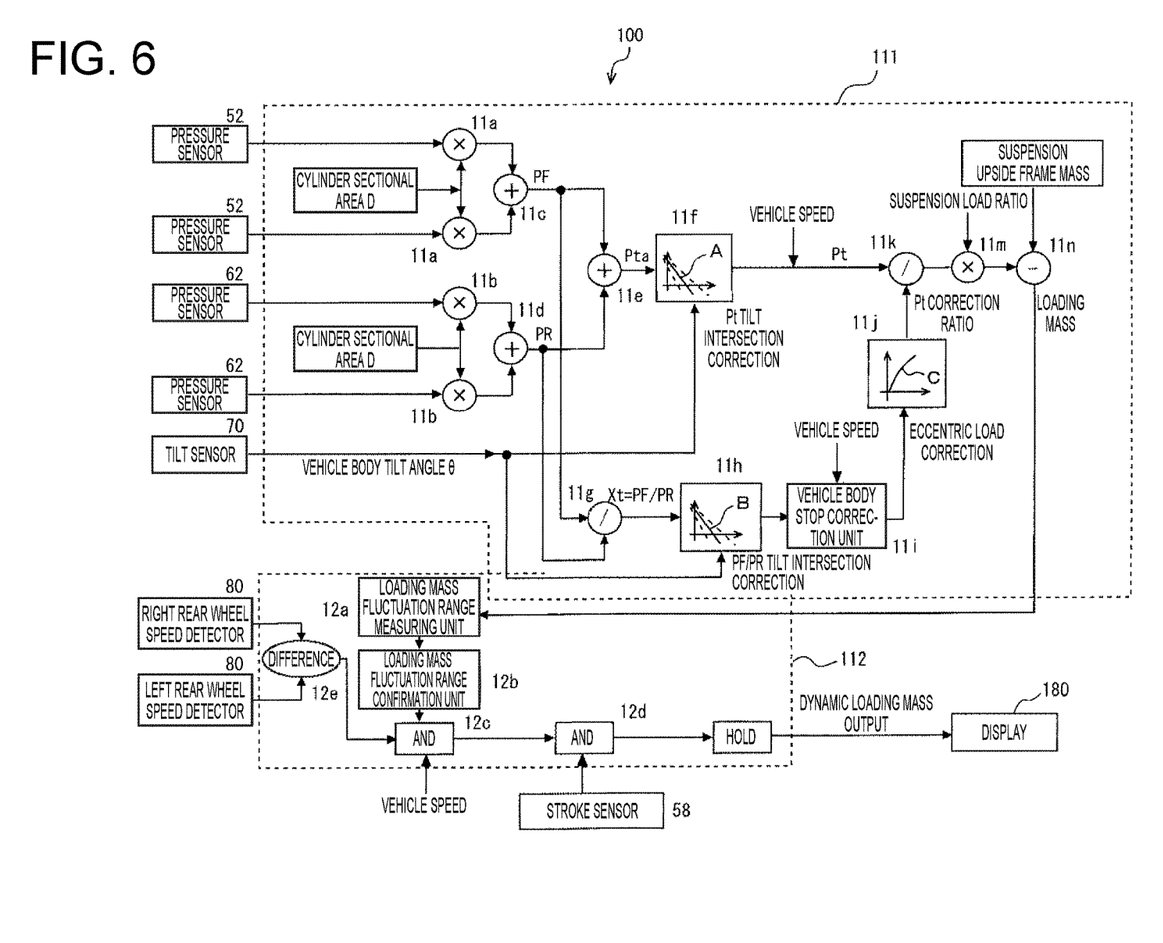
FIG. 6 is a functional block diagram showing the load measuring apparatus 100 according to the present invention.
Figure 7:
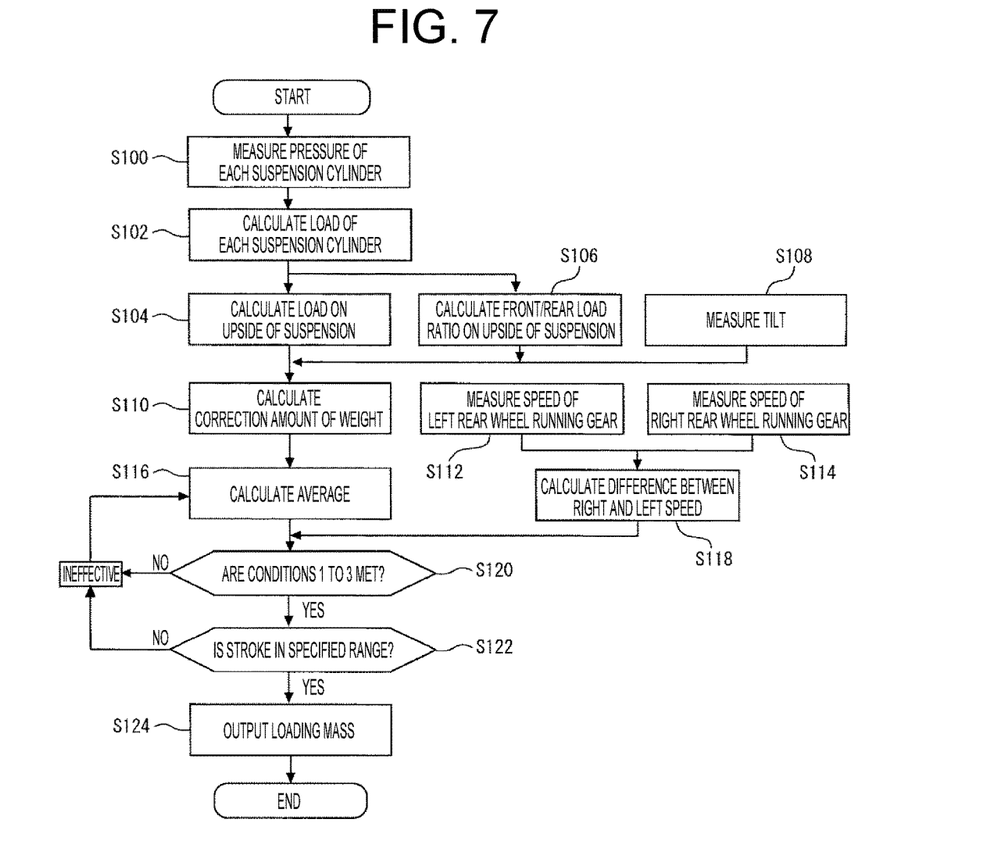
FIG. 7 is a flowchart showing one example of a process flow by the load measuring apparatus 100 according to the present invention.

Moreover, in this embodiment, reliability of load measurement is judged on the basis of the gas pressures of the suspension cylinders 51, 51, 61, 61. However, as shown in FIG. 2, a stroke sensor 58 that measures stroke width (extended or contracted quantity) of the suspension cylinders 51, 51, 61, 61 may be also provided in place of the gas pressure sensors 53, 53, 63, 63 of the suspension cylinders 51, 51, 61, 61 or together with the gas pressure sensors 53, 53, 63, 63. When the extended or contracted quantity of any of the suspension cylinders 51, 51, 61, 61 is extremely large, it can be also judged that the longitudinal and lateral balance of the vehicle body is unstable. In this case, as shown in FIGS. 6, 7, when the stroke width measured by the stroke sensor 58 of the suspension cylinders 51, 51, 61, 61 exceeds a specified range, it is also judged that the longitudinal and lateral balance of the vehicle body is unstable or that failure occurs in the suspension cylinders 51, 51, 61, 61 and the output may be also made ineffective.

REFERENCE SIGNS LIST

10: Vehicle body
50: Front wheel
51: Front-wheel side suspension cylinder
52, 62: Pressure sensor
53, 63: Gas pressure sensor
58: Stroke sensor
60: Rear wheel
61: Rear-wheel side suspension cylinder
80: Rear wheel speed detector
70: Tilt sensor
90: Vehicle speed detector
100: Load measuring apparatus
111: Loading weight arithmetic module
112: Loading weight confirmation module
12c: First confirmation arithmetic unit
12d: Second confirmation arithmetic unit
180: Display
200: Dump truck

The invention claimed is:

1. A load measuring apparatus for a construction machine comprising:
   a storage device configured to store a specified value; and
   an interface configured to receive four respective gas pressures inside of four respective suspension cylinders attached to front left, front right, rear left and rear right wheels of the construction machine which are measured by four respective gas pressure sensors attached thereto, and configured to receive four respective pressures of the four respective suspension cylinders which are measured by four respective pressure sensors attached thereto; and
   a processor connected to the storage device and the interface, and programmed to:
   calculate loads of the respective suspension cylinders from the respective measured pressures of the respective suspension cylinders measured by each of the respective pressure sensors,
   calculate a loading weight of the construction machine from the respective loads of the respective suspension cylinders,
   compare each of the measured gas pressures inside of the respective suspension cylinders measured by each of the respective gas pressure sensors with the specified value stored in the storage device,
   when all the gas pressures inside the suspension cylinders are equal to or larger than a specified value, output the calculated loading weight to the storage device, and
   when at least one of the gas pressures inside the suspension cylinders is less than the specified value, invalidate the calculated loading weight without outputting the calculated loading weight to the storage device.

2. The load measuring apparatus according to claim 1, wherein the specified value compared with the measured gas pressures inside of the suspension cylinders of the front left and front right wheels is different from the specified value compared with the measured loads of the suspension cylinders of the rear left and rear right wheels.

3. The load measuring apparatus according to claim 1, wherein the specified value compared with the measured gas pressures inside of the suspension cylinder of each of the front left, front right, rear left and rear right wheels is different.

4. A load measuring apparatus for a construction machine comprising:
   a storage device configured to store a specified value; and
   an interface configured to receive four respective stroke amounts of four respective suspension cylinders attached to front left, front right, rear left and rear right wheels of the construction machine which are measured by four respective stroke sensors attached thereto, and configured to receive four respective pressures of the four respective suspension cylinders which are measured by four respective pressure sensors attached thereto; and
   a processor connected to the storage device and the interface, and programmed to:
   calculate loads of the respective suspension cylinders from the respective measured pressures of the respective suspension cylinders measured by each of the respective pressure sensors,
   calculate a loading weight of the construction machine from the respective loads of the respective suspension cylinders,
   compare each of the measured stroke amounts of the suspension cylinders measured from the stroke sensors with the specified value stored in the storage device,
   when all the stroke amounts of the suspension cylinders are equal to or larger than a specified value, output the calculated loading weight to the storage device, and
   when at least one of the stroke amounts of the suspension cylinders is less than the specified value, invalidate the calculated loading weight without outputting the calculated loading weight to the storage device.

5. The load measuring apparatus according to claim 4, wherein the specified value compared with the measured stroke amount of the suspension cylinders of the front left and front right wheels is different from the specified value compared with the measured loads of the suspension cylinders of the rear left and rear right wheels.

6. The load measuring apparatus according to claim 4, wherein the specified value compared with the measured stroke amount of the suspension cylinder of each of the front left, front right, rear left and rear right wheels is different.

* * * * *